United States Patent
Lammerts et al.

(10) Patent No.: US 6,178,952 B1
(45) Date of Patent: *Jan. 30, 2001

(54) GASEOUS FUEL SUPPLY DEVICE FOR AN INTERNAL COMBUSTION ENGINE

(75) Inventors: Johannes J. A. M. Lammerts, Oss; Johannes L. L. Hessels, Mierlo; Antonius H. G. Kersten, Valkenswaard, all of (NL)

(73) Assignee: Indopar B.V., Eindhoven (NL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,089

(22) Filed: Dec. 24, 1997

(30) Foreign Application Priority Data

Jun. 28, 1995 (NL) .......................................... 100677

(51) Int. Cl.[7] ....................................................... F02B 43/00
(52) U.S. Cl. ................................... 123/527; 123/DIG. 12
(58) Field of Search .............................. 123/527, DIG. 12

(56) References Cited

U.S. PATENT DOCUMENTS

| | | | |
|---|---|---|---|
| 3,799,124 | 3/1974 | Swain | 123/1 A |
| 3,960,126 | * 6/1976 | Shinoda | 123/527 |
| 4,020,810 | * 5/1977 | Baverstock | 123/527 |
| 4,040,403 | * 8/1977 | Rose et al. | 123/133 |
| 4,159,701 | 7/1979 | Murata | 123/97 B |
| 4,386,593 | 6/1983 | Tibbs | 123/523 |
| 4,841,941 | * 6/1989 | Parietti | 123/527 |
| 5,150,690 | * 9/1992 | Carter et al. | 123/527 |
| 5,343,847 | 9/1994 | Chasteen et al. | 123/527 |
| 5,584,467 | * 12/1996 | Harnett et al. | 123/527 |

FOREIGN PATENT DOCUMENTS

| | | |
|---|---|---|
| 295243 | 12/1971 | (AT) . |
| B-60821/80 | 1/1981 | (AU) . |
| 43 44 715 A1 | 6/1994 | (DE) . |
| 0 060 656 A1 | 9/1982 | (EP) . |
| 8600062 | 8/1987 | (NL) . |
| 8600611 | 10/1987 | (NL) . |
| 9002862 | 7/1992 | (NL) . |
| WO 97/01701 | 1/1997 | (WO) . |

* cited by examiner

*Primary Examiner*—John Kwon
(74) *Attorney, Agent, or Firm*—Skjerven Morrill MacPherson LLP

(57) ABSTRACT

A device suitable for supplying a gaseous fuel to an internal combustion engine having combustion chambers includes an evaporator with a metering device, the metering device on an inlet side being in communication with an evaporating chamber disposed within the evaporator, and on an outlet side being provided with a main pipe, the main pipe downstream from the metering device branching into a number of pipes connected to individual combustion chambers. Each pipe is provided with a fixed predetermined local constriction, across which at least 85% of the pressure drop from the division of the main pipe into the individual pipes to the combustion chambers takes place, whereby the differences in the flow resistances of the local constrictions of the individual pipes are 5% at most.

10 Claims, 2 Drawing Sheets

GASEOUS FUEL SUPPLY DEVICE FOR AN INTERNAL COMBUSTION ENGINE

The present application claims priority under 35 U.S.C. 120 of PCT International application No. PCT/NL 96 00253, Publication No. WO 97/01701 designating the United States, filed Jun. 20, 1996.

BACKGROUND

1. Field of the Invention

A device suitable for supplying a gaseous fuel to an internal combustion engine, as well as an evaporator, a metering device, a processor and a pressure regulating unit suitable for use in such a device.

2. Description of Related Art

The invention relates to a device suitable for supplying a gaseous fuel to an internal combustion engine comprising combustion chambers, which device is provided with an evaporator and with a metering device, said metering device on an inlet side being in communication with an evaporating chamber disposed within said evaporator, and on an outlet side being provided with a main pipe, said main pipe after said metering device branching into a number of pipes connected to the individual combustion chambers.

The invention furthermore relates to an evaporator, a metering device, a processor and a pressure regulating unit suitable for use in such a device.

From NL-8600611 such a device is known with a pressure modulator 23 located in the main pipe. The main pipe is connected to a branching device 29 in which the main pipe branches in a number of pipes 30 connected to the individual combustion chambers. The function of the pressure modulator 23 is to prevent that the pressure fluctuations in the inlet manifold influence the stability of the pressure controller/evaporator. Hereby deviations between the desired total gas flow and the actual total gas flow are prevented. Such variations could obviously occur as a result of variation in the pressure line.

The systems as described in NL-A-8600611 will, however., suffer from a poor distribution over the various cylinders as no specific measures are taken in the distribution lines and as a result of differences in the flow resistances of the individual pipes and of dynamic pressure differences in the inlet manifold.

The object of the invention is to provide a relatively simple device, by means of which gas can be supplied to an internal combustion engine in a metered manner whereby an optimalisation of the equal distribution of the total gas flow over the different cylinders of the combustion engine is obtained.

With the device according to the invention this objective is accomplished in that each pipe is provided with a fixed predetermined local/constriction, across which at least 85% of the pressure drop from the division of the main pipe into the individual pipes to the combustion chambers takes place, whereby the differences in the flow resistances of the local constrictions of the individual pipes are 5% at most.

Dynamic pressure variations which occur in the inlet manifold near the combustion chambers and which depend inter alia on the number of revolutions and the load and the location of each combustion chamber cannot penetrate into the pipes of the device as a result of the damping effect of the local constrictions. Differences in the distribution of the gas flow, which will occur in the device known from the aforesaid Dutch patent application as a result of this disturbance, are practically fully adjusted by the local constrictions, therefore. In addition to that the influence of variations in the length and the curvature of the pipes between the main pipe and the combustion chamber has become negligibly small.

Because the gas supply is distributed precisely proportionally over the various combustion chambers, the exhaust gases of the various combustion chambers will have substantially the same composition.

It is noted that with a device disclosed in Dutch Patent Application NL-A-9002862 gas in liquid or gaseous form is evaporated in the evaporator and then metered and distributed over the various combustion chambers of the internal combustion engine by means of the metering device. The metering device is to this end provided with a number of passages, which number corresponds with the number of combustion chambers. The passages need to be manufactured with relatively great precision in order to obtain a proper metering as well as a proper distribution. A drawback of such a device is that the metering device is relatively complicated as a result of this. In addition to that the device is provided with a number of pressure regulating units, which number corresponds with the number of combustion chambers, which makes the device relatively costly.

It is furthermore noted that from U.S. Pat. No. 3,799,124 a device is known wherein the flow resistance of a pipe can be changed, for example by means of an adjusting screw. This device has a number of serious drawbacks In practice it is not possible to realize a proper adjustment for each individual combustion chamber. The air/fuel proportion is not measured individually for each combustion chamber.

Thus there is no feedback information with regard to the adjustment of the adjusting screw and the result achieved therewith. Furthermore the adjusting of the various adjusting screws is a relatively time-consuming activity. With the known device the flow ratio of the pipe is changed by means of the adjusting screw, in such a manner that differences in the length and curvature of the pipes are adjusted for. From the aforesaid US patent it is not known, however, to adjust for a comparatively more important aspect, namely the dynamic pressure variations in the inlet manifold at the combustion chambers.

It is noted that U.S. Pat. No. 4,386,593 describes a device with adjustable valves 30 in each hose. However, as has been indicated above with respect to U.S. Pat. No. 3,799,124, in practise it will hardly be possible to realise an adjustment which meets the requirements that are set by the latest regulations with respect to emission. Furthermore such adjustment is only possible with special test equipment and is very time consuming.

SUMMARY

One embodiment of the device according to the invention is characterized in that the outlet side of the metering device is connected to a pressure regulating chamber disposed within the evaporator, which pressure regulating chamber is separated from the evaporating chamber by a movable membrane, whereby the supply of liquid gas to the evaporating chamber can be regulated by means of said membrane.

The membrane may be spring-biased. As long as the (possible) spring pressure and the gas pressure in the pressure regulating chamber are greater than the gas pressure in the evaporating chamber, the supply of for example liquid gas to the evaporating chamber will remain open. As soon as the pressures in both chambers are equal, the gas supply is shut off. When the pressure after the local constrictions increases, the pressure before the local constriction will also increase. As soon as this pressure becomes greater than the pressure after the metering device, the pressure after the metering device will increase as well. When said pressure increases, the pressure in the pressure regulating chamber will increase and the gas supply to the evaporating chamber will be opened further, as a result of which more gas will flow into the combustion chamber and the gas pressure will increase until the pressure in the evaporating chamber and consequently before the metering device is so high that the pressure across the metering device will remain substantially constant and gas is supplied to the combustion chambers through the local constriction.

Another device according to the invention is characterized in that the metering device is provided with a controllable passage, whereby the width of said passage may be controlled in dependence on a petrol fuel requirement of the internal combustion engine present in a processor.

In this manner an efficient use is made of data with regard to the petrol fuel requirement of a petrol engine, which data is already present in a processor of a vehicle. With the device known from Dutch Patent Application NL-A-9002862 all kinds of data are measured by means of sensors and processed in order to determine the desired gas supply. At present most vehicles are already fitted with sensors for determining the petrol fuel requirement as standard, which means that the petrol requirement is already established. With the device according to the invention the processor determines the gas requirement on the basis of the established petrol fuel requirement. When the petrol fuel requirement changes as a result of changed operating conditions, the width of the passage, and thus the gas supply, is changed.

Another embodiment of the device according to the invention is characterized in that the width of the passage can be adjusted for differences between the use of gas and the use of petrol as the fuel for the combustion engine.

In this manner the gas supply can be adjusted for differences such as cold start mixture enrichment and full load mixture enrichment, which are necessary when the engine runs on petrol and which are not necessary when the engine runs on gas. When on the other hand the engine is fuelled by gas, adjustments need to be made for the density of the gas in dependence on the temperature and pressure.

Yet another embodiment of the device is characterized in that the device is provided with a pressure regulating unit, which is disposed between said metering device and said local constrictions.

The pressure drop across the metering device can be kept relatively small by means of the pressure regulating unit, as a result of which the metering device does not need to satisfy relatively heavy demands of accuracy. In addition to that the loads within the metering device are relatively low as a result of a relatively small pressure drop, which enables a quick and/or more inexpensive operation of the metering device.

Yet another embodiment of the device is characterized in that the pressure regulating unit is provided with an inlet, an outlet and a flow channel connected to said inlet and said outlet, in which flow channel a valve is movably provided so as to be capable of closing a passage between said inlet and said flow channel, said valve with a first end being connected to a first membrane, which constitutes a partition between the inlet and the flow channel on the one hand and a first pressure regulating chamber on the other hand, and with a second end being positioned opposite a second membrane, which extends parallel to said first membrane, said second membrane constituting a partition between said flow channel and a second pressure regulating chamber, whereby said valve can be pressed in the direction of said first membrane by means of said second membrane.

When the pressure in the flow channel is lower than in the second pressure regulating chamber, the second membrane abuts against the second end of the valve and the valve is pressed in the direction of the first membrane. As a result of the pressure in the first regulating chamber, however, the valve is also pressed in the direction of the second membrane by means of the first membrane.

The relatively low pressure in the flow channel exerts an identical suction force on both membranes and thus on the valve, as a result of which the valve is not moved by the pressure in the flow channel. With the valve described in Dutch Patent Application NL-A-9002862 an subatmospheric in the flow channel and in the outlet indeed has an undesirable influence on the movement of the valve. With the device according to the invention it is possible to use a relatively large valve and a relatively large flow channel without the movement of the valve being affected thereby.

When the pressure in the flow channel is higher than in the second pressure regulating chamber, the membranes are moved away from each other, whereby the second membrane will be positioned clear of the second end of the valve. The first membrane is pressed in the direction of the first pressure regulating chamber together with the valve, as a result of which the opening of the valve is facilitated.

BRIEF DESCRIPTION OF DRAWINGS

The invention will be explained in more detail with reference to the drawings, in which.

In the Figures like parts are numbered alike.

DETAILED DESCRIPTION OF THE PREFERRED EMBODIMENT

Figure 1:
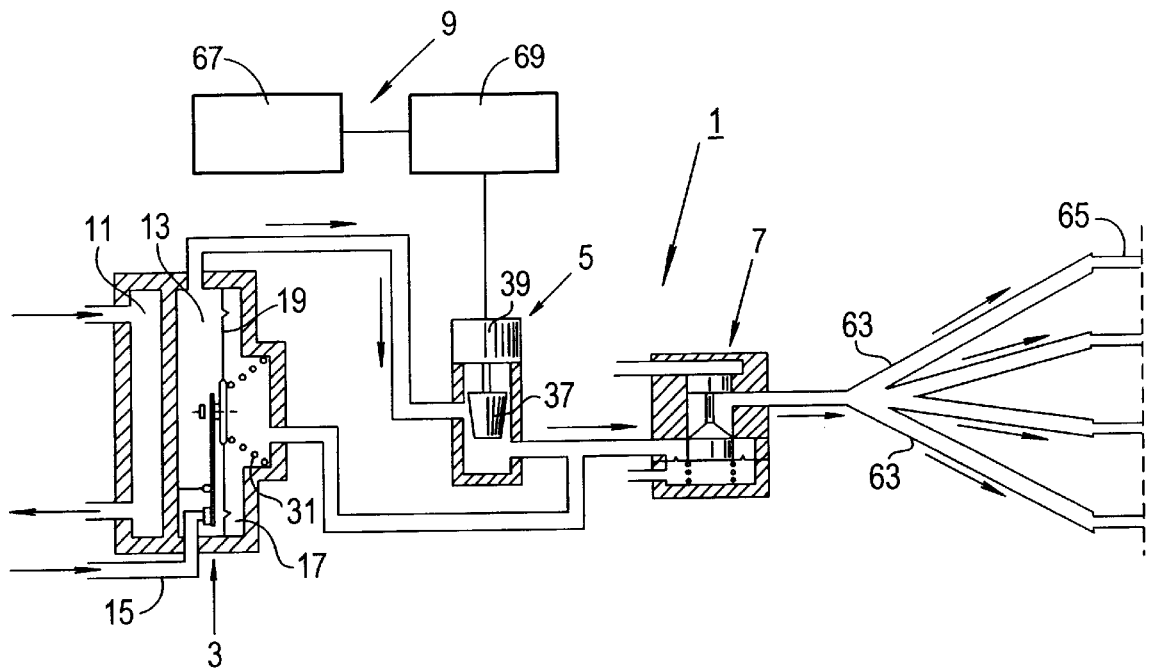
FIG. 1 shows a device according to the invention.
Figure 2:
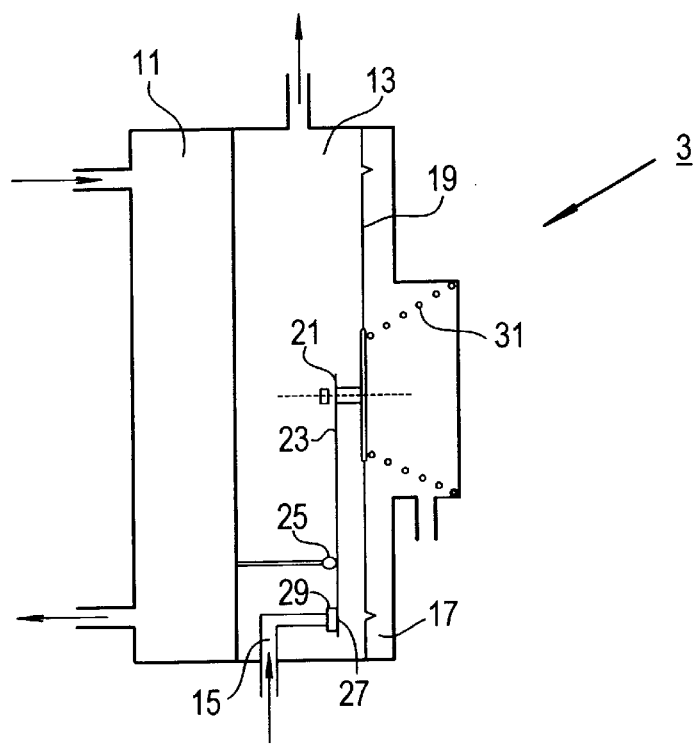
FIG. 2 shows an evaporator for a device shown in FIG. 1.

FIG. 1 shows a device 1 for supplying gas to combustion chambers of an internal combustion engine (not shown). The device 1 comprises an evaporator 3, a metering device 5, a pressure regulating unit 7 and a processor 9. The evaporator 3 (FIG. 2) comprises a water chamber 11, which is connected to a cooling water circuit (not shown) of the internal combustion engine, and an evaporating chamber 13 disposed adjacent to the water chamber 11, said evaporating chamber on one side being connected to a gas supply 15 and on the other side being connected to an input side of metering device 5. Evaporator 3 furthermore comprises a pressure regulating chamber 17, which is separated from evaporating chamber 13 by means of a membrane 19. Membrane 19 is connected to a first end 21 of a lever 23, which pivots about a pivot point 25. The second end 27 of lever 23 is provided with a valve 29, by means of which the gas supply 15 can be closed. A spring 31 is disposed within pressure regulating chamber 17, which spring presses membrane 19 in the direction of evaporating chamber 13. The pressure regulating chamber 17 is connected to an output side of metering device 5. Valve 29 will remain open as long as the spring pressure and the gas pressure in pressure regulating chamber 17 together are greater than the gas pressure in evaporating chamber 13. As soon as the pressure on both sides of membrane 29 is equal, lever 23 will tilt about pivot point 25 to a position in which valve 29 shuts off gas supply 15.

Figure 3:
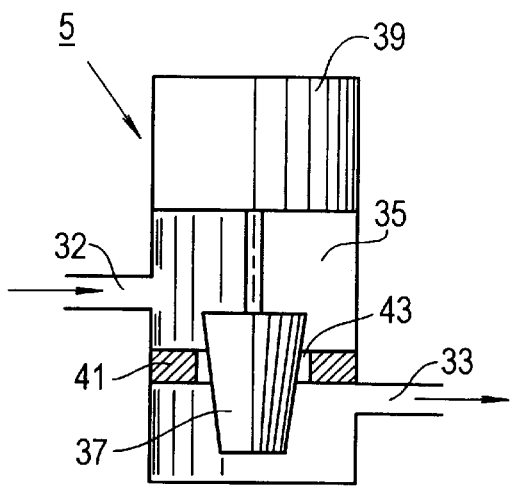
FIG. 3 shows a metering device for a device shown in FIG. 1.

Metering device 5 (FIG. 3) comprises an inlet side 32 and an outlet side 33 and a cylindrical chamber 35 therebetween, in which chamber a conical plunger 37 is movable with respect to a ring 41, for example by means of a stepping motor 39. The width of a passage 43 between plunger 37 and ring 41 is increased or decreased by moving conical plunger 37, as a result of which the amount of gas that flows through metering device 5 is increased or decreased.

Figure 4:
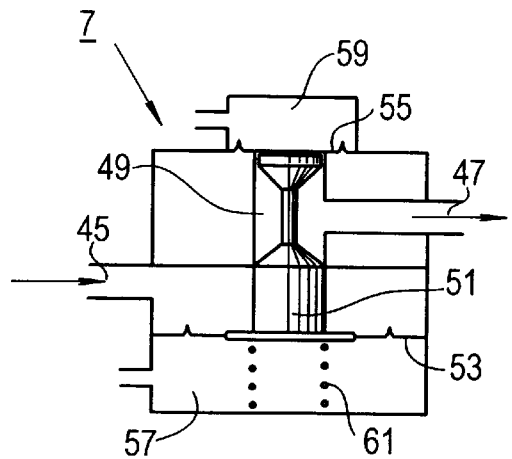
FIG. 4 shows a pressure regulating chamber for a device shown in FIG. 1.

The pressure regulating unit 7 (FIG. 4) comprises an inlet 45, an outlet 47 and a flow channel 49 therebetween. A valve 51 is capable of movement within flow channel 49, by means of which valve the communication between inlet 45 and outlet 47 can be shut off. Valve 51 is connected to a first membrane 53 with one end and is with a second end positioned opposite a second membrane 55 extending parallel to first membrane 53. Pressure regulating chambers 57, 59 are disposed on a side of membranes 53, 55 facing away from said valve, said pressure regulating chambers being connected to atmospheric pressure. A spring 61 is disposed within pressure regulating chamber 57, which spring presses against membrane 53. Gas which enters pressure regulating unit 7 via inlet 45 exerts a pressure on membrane 53. When this pressure is greater than the force exerted by spring 61 and said atmospheric pressure, valve 51 will be opened and gas will flow out of outlet 47 through flow channel 49. A gas pressure in outlet 47 which is lower than the pressure in pressure regulating chambers 57, 59 will not have an influence on the movement of valve 51, since the gas pressure acts on the same area both in the direction of membrane 53 and in the direction of membrane 55 positioned opposite thereto, and thus also in two opposite directions on valve 51. When the pressure in outlet 47 is higher than the pressure in pressure regulating chambers 57, 59, the second membrane 55 is moved away from the second end of valve 51 and the first membrane 53 is moved, together with valve 51, in the direction of the first pressure regulating chamber 57, as a result of which the opening of the valve is simplified. Valve 51 and flow channel 49 may be relatively large, which enables a good flow-through. Outlet 47 of pressure regulating unit 7 is connected to pipes 63, which are at another end connected to combustion chambers (not shown) of the internal combustion engine. Pipes 63 are provided with identical local constrictions 65 right before the inlet manifold. Pipe 63 has a diameter of 5 mm and local constriction 65 has a diameter of 2 mm±0.05 mm and a length of 2 mm, for example.

Another example concerns a pipe having a diameter D of 4 mm and a length L of 30 cm, the local constriction has a diameter d of 2 mm with a tolerance of 0.05 mm. The mass flow m is 1 g/second, whilst the specific mass $\rho$ equals 2 kg/m². The flow resistance $\lambda$ equals 0.016. In this case the variation in the flow resistance of the local constriction will be $$\frac{\Delta R}{R} = \frac{(d+0.05)^2 - d^2}{(d+0.05)^2} = 4.82\%$$

With the given mass flow and the specific mass of the medium the following pressure drop will occur across the local constriction and the pipe.

Local constriction:

$$v = \frac{m}{\rho \cdot A} = 159 \text{ [m/s]}$$

wherein A is the cross-sectional area of the local constriction. From this it follows that the pressure drop across the local constriction equals $\Delta p = \frac{1}{2}\rho v^2 = 0{,}235$ bar.

For pipe 63 it applies that:

$$v = \frac{m}{\rho \cdot A} = 40 \text{ [m/s]}$$

from which it follows that:

$\Delta p = \frac{1}{2}\rho v^2 \cdot \lambda L/D = 0{,}0192$ bar.

This implies that nearly 93% of the total pressure drop across the pipe having the local constriction takes place across the local constriction.

Figure 5:
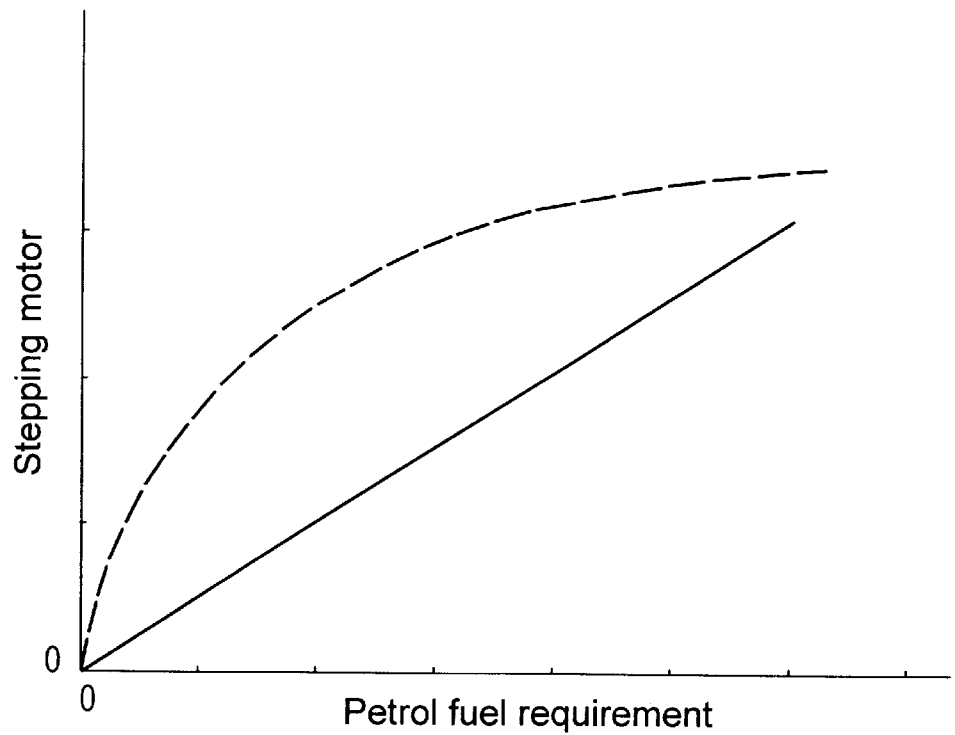
FIG. 5 shows a graph which illustrates a connection between the petrol fuel requirement of a petrol engine and a position of the plunger of a metering device according to the invention.

Processor 9 of device 1 comprises a gas management system 69, wherein a number of data are taken over from a petrol motor management system 67 known per se, which data is processed to produce a particular position of plunger 37 and thus a particular width of the passage 43 and the gas supply to the internal combustion engine. Among other things the petrol fuel requirement is taken over from said petrol motor management system 67, which is translated into a particular position of plunger 37, for example as shown in FIG. 5. On the basis of data from a so-called lambda probe a lambda value is determined by means of petrol motor management system 67, which value is a measure for an efficient combustion.

The operation of the device is as follows.

Gas from a gas tank, for example LPG or natural gas, is supplied to evaporating chamber 13 at a relatively high pressure and/or in liquid form. The hot cooling water in water chamber 11 heats and possibly evaporates the gas, which is supplied to metering device 5 under pressure. Depending on the desired amount of gas, plunger 37 is moved to a particular position, for example by means of stepping motor 39, thus determining the width of passage 43. Then the gas flows to pressure regulator 7, and valve 51 is opened as soon as the gas pressure in the inlet is greater than the atmospheric pressure and the spring pressure in pressure regulating chamber 57. The gas then flows to the combustion chambers through pipes 63 and the identical local constrictions 65. As a result of the presence of the identical local constrictions 65, high-frequency pressure fluctuations in the inlet manifold before the combustion chambers do not influence the pressure in outlet 47 of pressure regulating unit 7. When the internal combustion engine runs idle, the pressure before the combustion chambers is relatively low and the pressure in outlet 47 of the pressure regulating unit is much lower than the spring pressure 61 and the atmospheric pressure in pressure regulating chamber 57. Valve 51 will alternately be open or be closed, depending on the pressure in inlet 45. At full load, that is, when the throttle valve for the air supply is fully open, the pressure before the combustion chambers will run up, and thus the pressure before flow resistance 65 may run up to such a degree that the pressure in outlet 47 is greater than the pressure in pressure regulating chamber 57, which pressure is made up of the spring pressure 61 and the atmospheric pressure. In that case the pressure in inlet 45 will also increase to a level higher than the pressure in pressure regulating chamber 57, as a result of which valve 51 will be permanently open. The pressure in inlet 45 is also detected in pressure regulating chamber 17 of evaporator 3, as a result of which valve 29 is opened and gas will flow to evaporating chamber 13. The gas pressure in the entire device 1 will thereby run up to such a degree that the pressure across the metering device will remain constant, as a result of which a sufficient amount of gas will flow to the combustion chambers. When the internal combustion engine runs idle or at a relatively low number of revolutions, the pressure before the metering device 5 will be about 1.5 bar.

The constant pressure drop across metering device 5, which is determined in particular by spring 31, amounts to about 0.4 bar. Because of the relatively small constant pressure drop across metering device 5, said metering device 5 does not need to be manufactured with great precision in order to be able to ensure an accurate metering after all.

When the petrol fuel requirement of the petrol motor management system is translated into a gas fuel requirement by means of the gas management system 69, adjustments are made for the differences in the physical properties of the original fuel and the gaseous fuel. Unlike petrol, gas has a density which strongly depends on the prevailing temperature and pressure. Consequently it will be necessary to make a temperature adjustment as well as a pressure adjustment when translating the petrol fuel requirement determined by the petrol motor management system 69. With gas this correction is necessary because the amount of fuel being metered at a particular pressure level and pressure difference across metering device 5 depends on the temperature or the density of the gas. In the petrol motor management system 67 a so-called "cold start mixture enrichment" is frequently utilized. This means that additional petrol is supplied, because the evaporation of petrol is slowed down at lower temperatures and the combustion of the petrol being injected is not complete. This phenomenon does not occur with gas, because gas also mixes well with the air being supplied at lower temperatures, as a result of which complete combustion of the gas is also possible at lower temperatures.

The first adjustment concerns a difference between petrol and gas as the fuel being used. The second adjustment concerns the elimination of an adjustment made in the petrol motor management system with regard to the petrol fuel requirement, which adjustment is not necessary for gas.

The gas management system 69 determines the gas supply on the basis of the petrol fuel requirement determined by petrol motor management system 67. This implies that adjustments are automatically made for all influencing factors. The petrol fuel requirement may be derived from the petrol engine motor management system 67 via a databus or a control signal (duty cycle) from one or more petrol injectors.

It is also possible to accommodate the branching of the main pipe into the individual pipes 63 connected to the combustion chambers in pressure regulating unit 7, whereby pressure regulating unit 7 is provided with a number of outlets 47, which number corresponds with the number of combustion chambers.

Besides being conical plunger 37 may also be polynomially conical or otherwise, whereby a relatively small movement of the plunger has a larger or smaller influence on the gas supply, depending on the position of plunger 37.

Instead of using a relatively inexpensive one-stage evaporator 3, it is also possible to use a two-stage evaporator.

According to another possibility the gas is not supplied directly near the combustion chambers, but first led to the throttle valve via one pipe 63 and mixed with air before being supplied to the combustion chambers.

Evaporator 3, pressure regulating unit 7, gas management system 69 and the feedback from the outlet side of metering device 5 to evaporator 3 may also be used here.

What is claimed is:

1. A device (1) suitable for supplying a gaseous fuel to an internal combustion engine comprising combustion chambers, which device is provided with an evaporator (3) and with a metering device (5), said metering device (5) on an inlet side (32) being in communication with an evaporating chamber (13) disposed within said evaporator (3), and said metering device on an outlet side (33) being provided with a main pipe, said main pipe after said metering device (5) branching into a number of pipes (63) connected to the individual combustion chambers, characterized in that each pipe (63) is provided with a fixed predetermined local constriction (65), each said fixed local constriction being physically formed in said pipe to provide a non-variable, fixed, similar constriction in each said pipe, across which at least 85% of the pressure drop from the division of the main pipe into the individual pipes (63) to the combustion chambers takes place, whereby the differences in the flow resistances of the local constriction (65) of the individual pipes (63) are 5% at most, wherein the outlet side of the metering device (5) is connected to a pressure regulating chamber (17) disposed within the evaporator (3), which pressure regulating chamber (17) is separated from the evaporating chamber (13) by a movable membrane (19), whereby the supply of liquid gas to the evaporating chamber (13) is able to be regulated by means of said membrane (19).

2. A device according to claim 1, characterized in that the length of said local constriction (65) is 15 mm at most.

3. A device according to claim 1, characterized in that said metering device (5) is provided with a controllable passage (43), whereby the width of said passage (43) is controllable in dependence on a petrol fuel requirement of the internal combustion engine present in a processor.

4. A device according to claim 3, characterized in that the width of said passage (43) is adjustable for differences between the use of gas and the use of petrol as the fuel for the internal combustion engine.

5. A device according to claim 1, characterized in that the device is provided with a pressure regulating unit (7) which is disposed between said metering device (5) and said local constrictions (65).

6. A device according to claim 5, characterized in that said pressure regulating unit (7) is provided with an inlet (45), an outlet (47) and a flow channel (49) connected to said inlet and said outlet, in which flow channel (49) a valve (51) is movably provided so as to be capable of closing a passage between said inlet and said flow channel, said valve (51) with a first end being connected to a first membrane (53), which constitutes a partition between the inlet (45) and the flow channel (49) on the one hand and a first pressure regulating chamber (57) on the other hand, and with a second end being positioned opposite a second membrane (55), which extends parallel to said first membrane (53), said second membrane (55) constituting a partition between said flow channel (49) and a second pressure regulating chamber (59), whereby said valve (51) is movable in the direction of said first membrane (53) by means of said second membrane (55).

7. A device according to claim 5, wherein said pressure regulating unit comprises an inlet, an outlet and a flow channel therebetween, a valve movable in the channel to shut off communication between the inlet and the outlet, and a pair of membranes and a spring for opening said valve.

8. A device according to claim 1, wherein the evaporator comprises a water chamber, the evaporating chamber, a pressure regulating chamber and a membrane separating the pressure regulating chamber from the evaporating chamber.

9. A device according to claim 1, wherein the metering device comprises an inlet, an outlet and a chamber therebetween, a passage between the inlet and the outlet and a plunger in the passage for controlling flow of the gaseous fuel to the outlet.

10. A device according to claim 9 further comprising a processor for positioning said plunger in said passage for controlling the flow of gaseous fuel to the outlet.

* * * * *